United States Patent [19]
Boucher et al.

[11] 4,176,494
[45] Dec. 4, 1979

[54] AGRARIAN STAKE

[76] Inventors: Claude Boucher; Jacqueline Boucher, both of 101 des Prés St., Vaudreuil-sur-le-lac, Canada, J7V 5V5

[21] Appl. No.: 907,133

[22] Filed: May 17, 1978

[51] Int. Cl.² .............................................. A01G 9/12
[52] U.S. Cl. .......................................... 47/47; 256/50; 256/57; 256/58
[58] Field of Search ...................................... 47/42–47; 256/58, 57, 54, 50, 51

[56] References Cited

U.S. PATENT DOCUMENTS

| 563,842 | 7/1896 | Chance | 256/58 |
| 2,903,823 | 9/1959 | Westford | 47/47 |
| 3,188,771 | 6/1965 | Ballai | 47/47 |
| 3,494,072 | 2/1970 | Olson | 47/44 |
| 3,579,908 | 5/1971 | Morgan | 47/45 |

FOREIGN PATENT DOCUMENTS

| 2034448 | 2/1972 | Fed. Rep. of Germany | 47/46 |
| 366691 | 10/1906 | France | 47/44 |
| 2238424 | 2/1975 | France | 47/46 |
| 463818 | 4/1937 | United Kingdom | 47/47 |
| 752211 | 7/1956 | United Kingdom | 47/47 |

Primary Examiner—Edgar S. Burr
Assistant Examiner—Steven A. Bratlie

[57] ABSTRACT

A stake for supporting weak-stemmed plants including, in one embodiment, an X-shape cross-sectional configuration wherein four orthogonally disposed arms, each having an arrowhead end, radiate outward from a common central vertical axis. A semi-annular clasp to retain a plant stem has reversed hook ends for snap-fit into the openings defined by the arrowheads on each side of the stake. In a second embodiment, the stake includes a central cylinder about which are disposed the arms, the cylinder serving to contain granular fertilizer for gradual dissolution into the earth around a supported plant.

2 Claims, 7 Drawing Figures

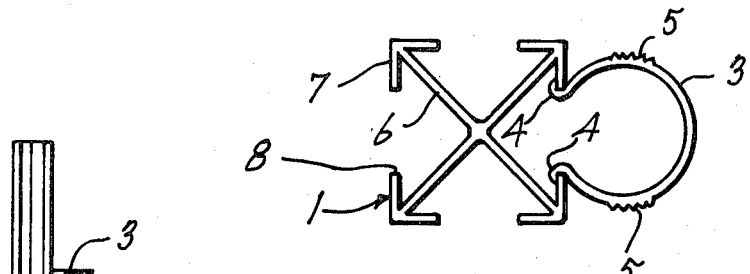
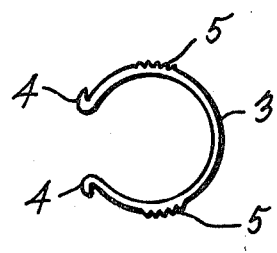
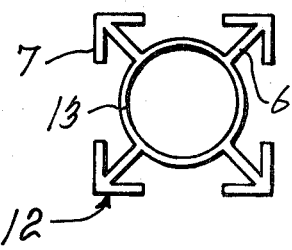
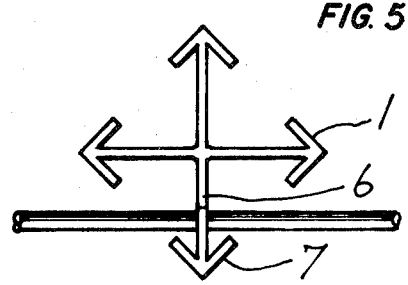
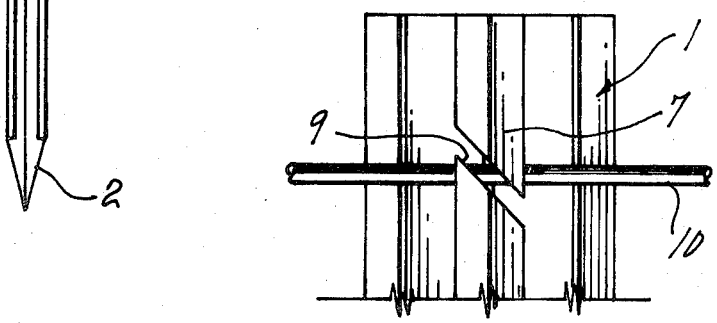

AGRARIAN STAKE

FIELD OF THE INVENTION

This invention relates to the horticultural field of vegetable raising and to the field of fence posting or staking in agrarian use. It consists simply of a stake provided with means to releasably and gently secure plant stems and/or branches thereto and is specifically applicable in the art of growing tomato plants.

BACKGROUND OF THE INVENTION

It is well known in horticulture to provide wooden or metallic stakes for supporting fruit, flower and vegetable plants during their growth or at certain stages of their growth when the stems are tender and liable to break. Once the stake is in the ground, twine or wire is usually used to provide a tie between the plant and the stake. Not only is this time-consuming and difficult, especially for a single horticulturalist at work, but the task has to be periodically repeated as a plant grows.

SUBJECT OF THE INVENTION

The present invention is also a stake, but one with a very novel design. In one embodiment, it is cross-sectionally X-shaped and includes an agraffe or clasp which may be encircled around a plant shoot and then snap-fitted onto the stake anywhere along its length and in any of four directions. The clasp, thus secured, may also move up the stake harmoniously with the growth of its stem.

Accordingly, it is a prime object of the present invention to provide an agrarian stake which greatly simplifies the work of tying plants in need of support.

Another object of the present invention is to provide an agrarian stake which ensures gentle but firm bracing of plants without the use of twine, string or wire.

Another object of the present invention is to provide an agrarian stake which is inexpensive and adaptable to another use, namely: fencing stakes.

These and other objects of the invention will become clear by referral to the following disclosure and the accompanying illustrations in the form of drawings, wherein:

FIG. 2 is a side elevation of the stake and of a class;

FIG. 3 is a top end view of one embodiment of the stake with a clasp;

FIG. 4 is an end view of a clasp;

FIG. 5 is a top end view of a second embodiment of the stake;

FIG. 6 is a top end view of the first embodiment used as a fence stake;

FIG. 7 is a side elevation of a fence stake according to FIG. 6.

Like reference numerals refer to like elements throughout the drawings.

DETAIL OF DESCRIPTION OF THE EMBODIMENTS OF THE INVENTION

Figure 1:
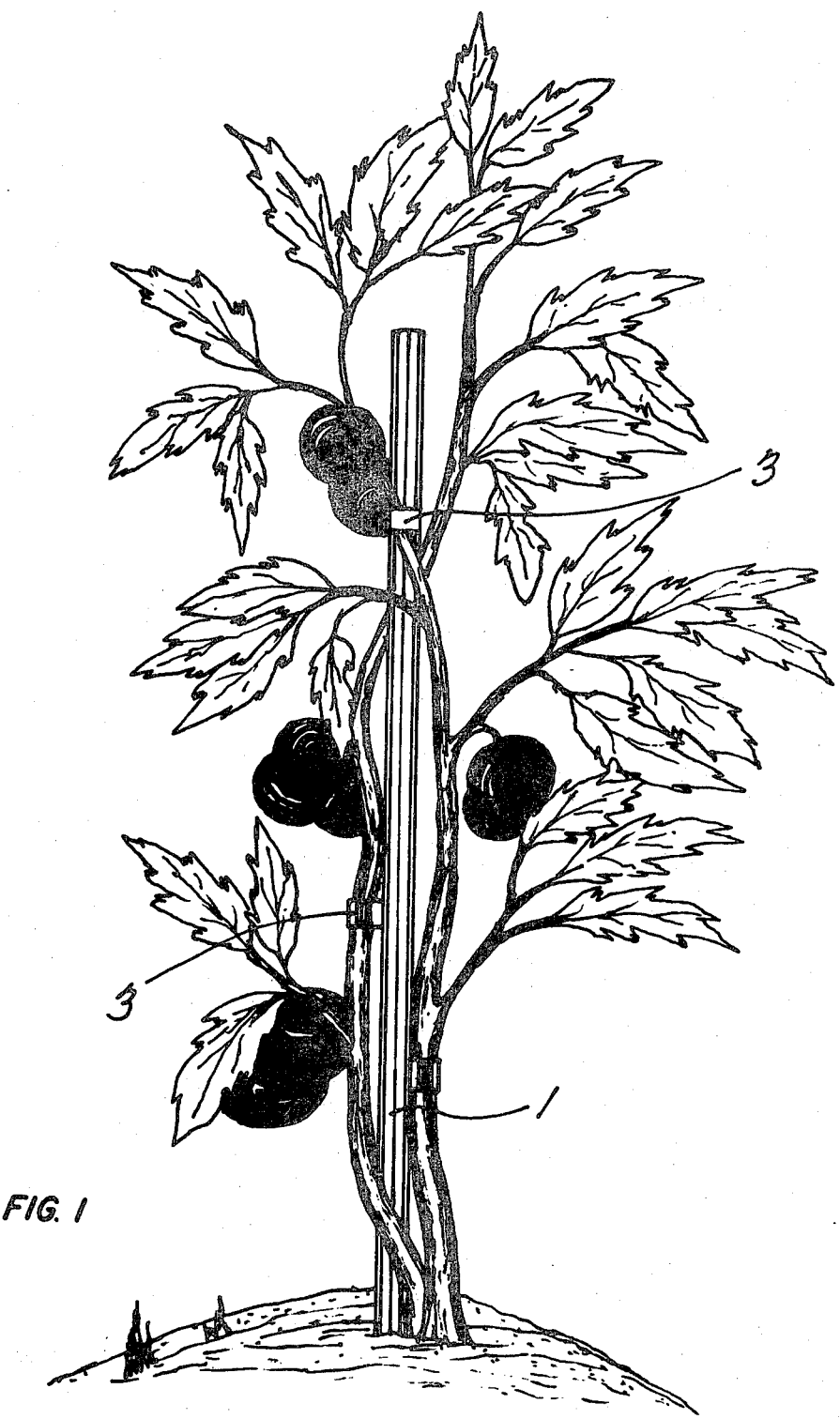
FIG. 1 is a perspective view of the agrarian stake in use with a tomato vine.

The stake 1 is preferably made of plastic but may also be of a suitable metallic alloy or aluminum. All of these materials are slightly flexible as well as rigid, which is advantageous in a strong wind. Stake 1 tapers to a point 2 so that it may easily be driven into earth.

When seen in cross-section, stake 1 has four orthogonally disposed arms 6, each of equal length and radiating out from a common central vertical axis. The end of each arm is provided with a right-angled configuration in the shape of an arrowhead 7, such that equal spaces 8 are defined on the four sides of stake 1 and along the stake 1, as shown clearly in FIGS. 3 and 1.

A clasp, or agraffe 3, consisting of a band of semi-annular shape, is provided with reversed hooks 4, at both of its two ends. Hooks 4 are adapted to fit behind the arrowheads 7 in a space 8, as shown in FIG. 3. Clasps 3 are made of resilient material, such as plastic.

It is readily evident that clasps 3 are first gently introduced around the stem of a plant, such as the tomato vine of FIG. 1, and then slightly compressed to permit a resilient snap fit in a space 8 of stake 1, as described above. To facilitate the task, each clasp 3 is provided on its opposite outer surface with raised ridges, or gnarling 5, thus assuring a no-slip grip on the clasp.

The great advantages of clasps 3 with stake 1 is also readily evident. The once difficult chore of constantly tying plants to a stake with twine and knots is eliminated. Instead, the operation consists simply of taking a clasp 3 with the thumb and forefinger of one hand, while the other hand supports the plant, fitting the clasp 3, where desired, along the stem and then securing the clasp 3 to stake 1. It is to be noted that two hands are simultaneously required to tie string, thus making the support of the plant while tying more difficult. Moreover, clasps 3 fit tightly enough in stake 1, so that it will not become undone by itself, but not so tightly that it cannot slide up the stake as the plant grows. Moreover, if it is desired to secure the clasp at a different place, no cutting of knots or undoing of string is necessary. Finally, any number of clasps may be secured in each of the four spaces 8 of stake 1, which assures a natural and complete support of a plant regardless of which direction it has taken in its upward wriggling. This is clearly suggested in FIG. 1. It is to be noted also that clasps of different diametrical sizes may be used in the same spaces 8 to accommodate greater or lesser stem thickness.

Referring now to FIGS. 6 and 7, stake 1 may also be conveniently used as a fence stake. To this end, an arm 6 and its corresponding arrowhead end 7 are provided with a diagonal slot 9. A fence means, such as an electric wire 10, is introduced into the slot and is thus held secure from outward displacement, since the slot is diagonal. In this manner, a wandering quadruped may be shocked into territorial reality and prevented from trampling the tomato patch on the other side of the fence.

In a second preferred embodiment, stake 1 is replaced by stake 12 (FIG. 5). Stake 12 includes arms 6 and corresponding arrowhead ends 7 but the common vertical axis is shaped as a central open-ended cylinder 13. The stake 12 is useful in the application described above with the additional feature that fertilizer may be introduced into cylinder 13. The soil around the plant is kept constantly enriched by the slow absorption of fertilizer into the earth from the stake.

The present invention has been found particularly useful in the cultivation of tomato vines. However, it is clear that it may also be successfully applied to the cultivation of any number of species of flowering, fruit or vegetable plants which need support.

It is understood that various modifications may be made to the present invention without departing from the scope of the following claims, or injuring the spirit of the disclosure.

What we claim is:

1. An agrarian stake comprising a straight four sided rod-like, ground engaging element of uniform X-shaped cross-section throughout the major part of its length, said element defining four orthogonally disposed and radially outwardly extending arms having their longitudinal outer edges equally radially spaced from the longitudinal axis of said element, the outer longitudinal edge of each arm having an arrowhead cross-section defining, on each side of said arm, a laterally protruding flange making a 45 degree angle with the associated arm, said arms defining between themselves four similar spaces opening at the four sides of said element, said flanges being co-planar, two by two, and each pair of co-planar flanges forming one side of said element and partially closing said space, and a clasp consisting of a band of resilient material formed into a semi-annular shape for encircling a plant stem, said band having an out turned hook at each end for snap fit removable attachment with any one of said pair of flanges by insertion within the associated space, whereby said clasp may be attached at any point longitudinally of said element and to any of its four sides and said clasp may slide along said element upon a force exerted on the same in a direction substantially parallel to the longitudinal axis of said element.

2. An agrarian stake as defined in claim 1 wherein said clasp is integrally formed with transversely extending ridges at its opposite outer sides whereby the clasp may be grasped between thumb and forefinger without slipping thereof.

* * * * *